(12) United States Patent
Conwell et al.

(10) Patent No.: US 7,338,914 B2
(45) Date of Patent: Mar. 4, 2008

(54) RFID TIRE LABEL

(75) Inventors: Kevin Conwell, Fairfield, OH (US); Tom Rogers, Medina, OH (US)

(73) Assignee: Intermec IP Corp., Everett, WA (US)

( * ) Notice: Subject to any disclaimer, the term of this patent is extended or adjusted under 35 U.S.C. 154(b) by 101 days.

(21) Appl. No.: 10/814,436

(22) Filed: Mar. 31, 2004

(65) Prior Publication Data

US 2005/0221704 A1 Oct. 6, 2005

(51) Int. Cl.
  *B32B 7/12* (2006.01)
(52) U.S. Cl. .............. 442/149; 442/150; 442/151; 428/40.1; 428/343; 428/353; 428/354
(58) Field of Classification Search ............ 442/149, 442/150, 151; 428/343, 354, 40.1, 353
See application file for complete search history.

(56) References Cited

U.S. PATENT DOCUMENTS

| | | | |
|---|---|---|---|
| 3,645,832 A | 2/1972 | Sauer | 156/541 |
| 4,010,353 A | 3/1977 | Moldovan, Jr. et al. | 235/54 |
| 4,010,354 A | 3/1977 | Apicella, Jr. et al. | 235/61.6 R |
| 4,190,460 A | 2/1980 | Cassar | 106/287.32 |
| 4,261,403 A | 4/1981 | Imai et al. | 152/209 |
| 4,720,526 A | 1/1988 | Roland | 525/273 |
| 4,911,217 A | 3/1990 | Dunn et al. | 152/152.1 |
| 5,023,292 A | 6/1991 | Hong et al. | 524/432 |
| 5,160,383 A | 11/1992 | Gartland et al. | 152/510 |
| 5,186,782 A | 2/1993 | Freedman | 156/244.11 |
| 5,264,066 A | 11/1993 | Lundell | 156/361 |
| 5,358,772 A * | 10/1994 | Nakagawa et al. | 428/148 |
| 5,393,821 A | 2/1995 | Shieh et al. | 524/495 |
| 5,516,393 A | 5/1996 | Freedman | 156/229 |
| 5,527,407 A | 6/1996 | Gartland et al. | 156/64 |
| 5,684,091 A | 11/1997 | Maly et al. | 525/332.5 |
| 5,709,918 A | 1/1998 | Kimijima et al. | 428/40.1 |
| 5,736,470 A * | 4/1998 | Schneberger et al. | 442/151 |
| 5,824,397 A | 10/1998 | Koops et al. | 428/207 |
| 5,852,099 A | 12/1998 | Vanel | 524/494 |
| 5,872,188 A | 2/1999 | Datta et al. | 525/150 |
| 5,977,238 A | 11/1999 | Labauze | 524/492 |
| 5,977,239 A | 11/1999 | Chauffour et al. | 524/492 |
| 5,993,961 A | 11/1999 | Ugolick et al. | 428/354 |
| 6,071,995 A | 6/2000 | Labauze | 524/269 |
| 6,206,292 B1 | 3/2001 | Robertz et al. | 235/488 |
| 6,221,453 B1 * | 4/2001 | Majumdar | 428/40.2 |
| 6,235,363 B1 * | 5/2001 | Bilodeau | 428/40.1 |
| 6,238,760 B1 * | 5/2001 | Majumdar et al. | 428/40.1 |
| 6,291,572 B1 | 9/2001 | Brown et al. | 524/492 |

(Continued)

OTHER PUBLICATIONS

Automotive Industry Action Group B-1 Guideline "Tire and Wheel Identification Standard".

(Continued)

*Primary Examiner*—Daniel Zirker
(74) *Attorney, Agent, or Firm*—Seed IP Law Group PLLC

(57) ABSTRACT

A tire label that is adapted to adhere to the surface of an irregular surface. The inventive tire label uses a label stock made of an openwork fabric that is a mesh, woven or knit. Optionally, a cap can be used on the label. Preferably, the label has an RFID chip.

18 Claims, 3 Drawing Sheets

U.S. PATENT DOCUMENTS

| | | |
|---|---|---|
| 6,312,777 B1 | 11/2001 | Smith ................ 428/41.8 |
| 6,319,993 B2 | 11/2001 | Weidenhaupt et al. ... 525/332.6 |
| 6,358,605 B1 | 3/2002 | Casper ................ 428/343 |
| 6,375,780 B1 | 4/2002 | Tuttle et al. ........... 156/226 |
| 6,432,529 B1* | 8/2002 | Harder et al. ......... 428/355 AC |
| 2003/0211273 A1* | 11/2003 | Perry et al. ........... 428/41.8 |
| 2004/0095244 A1* | 5/2004 | Conwell et al. ........ 340/572.8 |
| 2005/0059308 A1 | 3/2005 | Parsons ............... 442/149 |
| 2005/0221704 A1* | 10/2005 | Conwell et al. ........ 442/149 |

OTHER PUBLICATIONS

DuPont Electronics: Kapton® polyimide film, Products and Services List.

National Highway Traffic Safety Administration, "Transportation Recall Enhancement, Accountability, and Documentation (TREAD) Act".

\* cited by examiner

RFID TIRE LABEL

BACKGROUND OF THE INVENTION

1. Field of the Invention

The invention relates to labels. More specifically it relates to tire labels with RFID tags.

2. Description of the Related Art

Most tire labels whether they are tread labels or smart labels with RFID inserts are made from solid label films extruded from polymers such as polypropylene, polyethylene, polyvinyl chloride (vinyl), polyolefins and copolymer blends. The problem with these solid films is they can be stiff and non-conformable. Continuous exposure to ultraviolet radiation (sunlight) and high/low temperature extremes (thermal cycling) breaks down the film, resulting in loss of tensile strength, cracking, crazing, staining, and discoloration. Loss of plasticizers within the film also leads to a reduction in flexibility and conformability, as the label becomes hard and brittle.

The use of multi-layer films, primers, barrier layers and adhesive constructions is sometimes used to resist migration of mobile ingredients such as oils, resins, tackifiers, or plasticizers from within the rubber based adhesive layer that exhibit a high affinity for polyolefin face stocks. This migration of mobile ingredients into the label film often manifests itself as swelling or hardening of the label face stock which, in turn, leads to wrinkling of the label constructions and general loss of adhesion.

Barrier films and primer layers are sometimes used between the back of the label film and adhesive layer to prevent discoloration and loss of adhesion caused by migration of low molecular weight mobile components such as waxes, extender oils, lubricants, anti-reversion coagents, sulphide resins, and plasticized sulfur from within the tire into the label face stock and adhesive as the tire ages. This diffusion process can be restricted or influenced by several factors such as ambient temperature, humidity, concentration of filler contaminants in the rubber tire compound, the chemical make up of the label face stock, the chemical make up of the pressure sensitive adhesive, the thickness of the label face stock, and the thickness of the adhesive. Higher ambient temperature and humidity levels generally accelerate the diffusion process. Thus, it is desirable to have a label construction that restricts or prevents this diffusion process.

Typical tire labels may utilize multi-layer face stocks in combination with barrier layers, but the additional processing steps and curing of barrier components can make these constructions expensive to manufacture. To prevent diffusion of mobile low molecular weight components into the adhesive and label face stock the barrier layer must be designed to meet one or both of the following conditions:

The barrier layer must be comprised of a material that is dissimilar in terms of polarity. Since diffusion is promoted with materials of like chemistry, a dissimilar material will inhibit diffusion. For example, a non-polar material such as oil will not diffuse well through a solid polar film such as polyester (PET).

The barrier layer is comprised of a polymeric material that has specific structure such that migration of low molecular weight materials is restricted due to size exclusion. A highly branched polymer such as a solid polyester film may prevent component migration.

The problem with solid polyester film is high stiffness. This type of label film is not suitable for labeling a tire surface because it is not flexible and does not conform well to surface irregularities such as raised lettering, serrations, vent ports, and deep tread patterns. High stiffness prevents a good adhesive bond to build between the label and tire surface, thus, the PET label is likely to lift and fall off or catch on something and peel away.

BRIEF SUMMARY OF THE INVENTION

Embedded RFID tags have yet to be developed, tested and proven as a reliable and durable method of tracking tires.

The RFID tire label taught herein is attached with a pressure sensitive adhesive to a tire (inside or outside) for use in automating the collection of information through the wheel mounting and final assembly processes. This RFID tire label design preferably uses an open mesh of woven polyester filaments for the label face stock.

A "smart label" with an RFID insert is a readily available user-friendly technology for tire traceability. The label provides protection for the IC and antenna from damage and abrasion. The label adhesive over the RFID insert provides an additional seal to protect the insert from fluids such as tire lubricants.

Stiff label films tend to lift from the tire surface and offer limited adhesion due to non-conforming solid films. In the present invention, a flexible open polyester mesh provides excellent label conformance and adhesion. Low stiffness allows the label to quickly conform to tire surface irregularities such as raised lettering, serrated patterns, vent ports and deep tread patterns. The adhesive flows in between the open mesh filaments provides a stronger mechanical adhesive bond because there is greater surface area around the filaments for the adhesive to attach to than with a solid label film.

Prior art tire labels have weak adhesive bonds and label staining occurs due to outgassing and migration of low molecular weight tire components. As disclosed herein, the use of an open mesh breathes and resists plasticizer migration and outgassing. A higher coat weight of adhesive maintains a more secure bond at the adhesive-film interface as plasticizers and other low molecular weight additives within the rubber tire compound migrate to the tire surface and into the adhesive and label.

As label tags age they can become brittle, losing their tensile strength. Thus, prior art tire labels often tear when removed. A polyester mesh face stock is stronger and more tear resistant than a plastic coated cotton fabric or softer conventional tire label films such as vinyl, polyethylene and polypropylene. Thus, it can easily be removed in one piece from the tire surface without tearing.

BRIEF DESCRIPTION OF THE SEVERAL VIEWS OF THE DRAWINGS

FIG. 3A is a cross section of an alternative embodiment of a tire label before being attached or pressed on.

FIG. 3B is a cross section of the alternative embodiment of FIG. 3A after being adhered to a surface or pressed on.

DETAILED DESCRIPTION OF THE INVENTION

Figure 1:
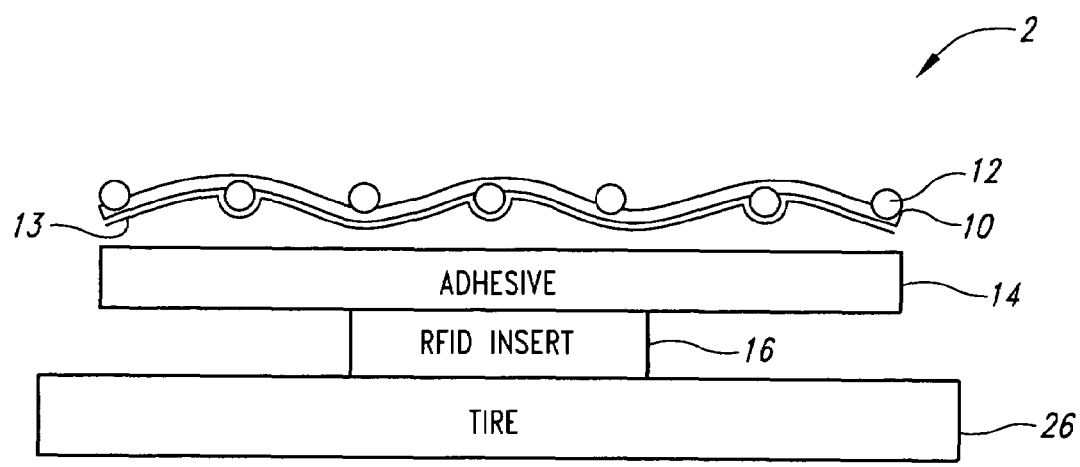
FIG. 1 is a cross sectional view of a tire label according to one illustrated embodiment.
Figure 2:
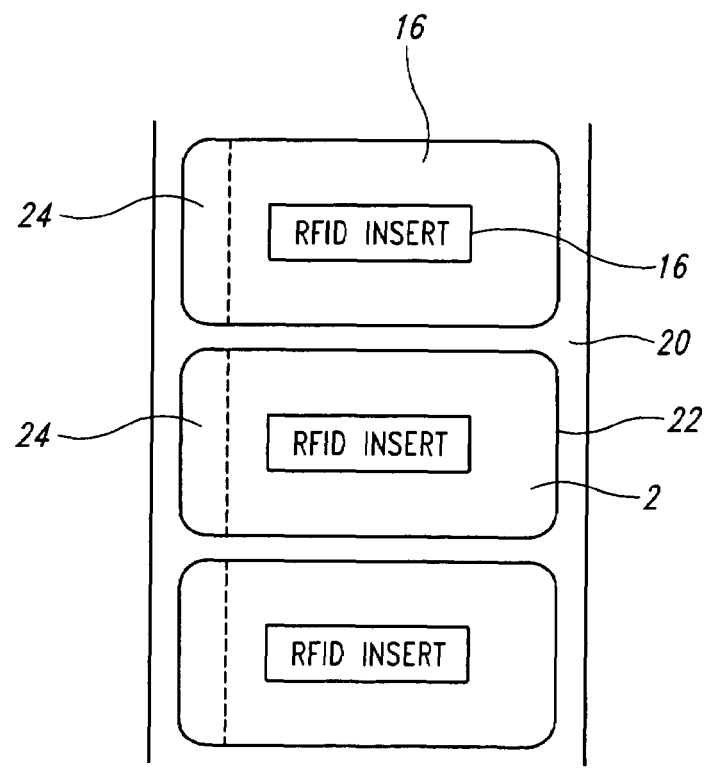
FIG. 2 is a top view of a die cut label web.

Radio frequency transponders (RFID tags) generally include an antenna and integrated memory circuit with read/write capability used to store digital information, such as an electrically erasable programmable read only memory (EEPROM) or similar electronic device. Active RFID tags include their own radio transceiver and power source, for example a battery, and are generally sealed within a molded plastic housing. Passive RFID tags are energized to transmit and receive data by an electromagnetic field and do not include a radio transceiver or power source. As a result, they are small and inexpensive with limited range, resolution and data storage capacity. Passive RFID tag inserts used in the Automatic Identification Industry are typically laminated or inserted into a paper or plastic label stock backed with pressure sensitive adhesive for applying the printed label to a carton, pallet, airline baggage, parcel or other article to be tracked. These labels are commonly referred to as "smart labels".

The figures show various embodiments of a label 2 which comprises a label face stock 10 preferably made from a woven polyester mesh and coated on at least one side with a rubber-based pressure sensitive adhesive 14 for attaching an RFID insert 16 to a tire. The label 2 may be oversized to seal and bond to the tire around the RFID insert 16, providing a tight, secure bond resistant to abrasion and fluids. The label face stock 10 may be polyester, nylon, cotton or other woven mesh of organic, synthetic or blend of filaments 12 with low stiffness properties for conforming to a tire surface. The label face stock 10 can be made of a mesh, woven or knit fabric. Mesh refers to openwork fabric, woven refers to interlaced network of threads, and knit refers to fabric made by intertwining threads in a series of connected loops. Preferably, the fabric is a mesh. The preferred filaments 12 are 64-micron diameter and the preferred fabric has a thread count of 156 threads per inch to provide an optimum adhesive bond yet minimize adhesive flow through the label face stock or fabric 10. Thread count, diameter and weave pattern may be changed to produce the desired thickness and flexibility for the label.

The label 2 may be dyed, pigmented or printed to any color or pattern. The label 2 may be printed with indicia including text, graphic or bar codes. The underside of the label face stock 10 may be coated or treated with a primer 13 (FIG. 1) to improve the interface bond with the adhesive.

In some embodiments, the label 2 may include an intermediate layer 17 of label face stock material that can be capped or laminated with a cap layer 18 (FIGS. 3A-3C) which may comprise another film, coating or woven material 18 for additional stiffness, printability or prevention of adhesive flow through the label face stock 10. Alternatively, in some embodiments, the label face stock 10 could also be made from a more tightly woven pattern of filaments 12 for a closed mesh design that would prevent adhesive bleed through and enhance printability.

Adhesive 14 thickness preferably is between 3-6 mils, but thickness can be more or less depending upon the desired adhesion level. Additional adhesive 14 may be applied to the back of the RFID insert 16 so that it provides a better bond for the insert to the tire surface 26. Other methods of label attachment may be used including heat seal, uv-cured, epoxy, acrylic based pressure sensitive adhesives or blends of polymers and/or copolymers.

A release liner 20 may be used to protect the adhesive 14 prior to use. The tire labels 2 can be manufactured in a roll or fan folded configuration. The label 2 configuration can be provided with singulated labels on the web, or in a continuous web (non-singulated) to be manually or automatically cut.

Labels preferably are approximately 4"×2", but are not limited to this size. Preferably, the labels are die cut labels 22 (FIG. 3). Each label 2 may have a dry pull-tab 24, i.e., an area without adhesive along one edge to facilitate easy removal. Pull-tabs 24 may be readily identified by a printed arrow, mark, color or other method of visible detection.

Each label 2 attached to the outer surface of a tire 26 can contain a single RFID insert 16, or multiple inserts. Smart labels 2 can be manufactured with RFID inserts 16 embedded in the label, or RFID inserts 16 can be introduced to the label 2 at the time it is applied to the tire surface.

The use of the woven mesh label face stock 10 is not limited to smart labels with RFID inserts 16. A label face stock 10 may also be used for other tire labels including tread labels, retail labels, high point labels and match mount labels.

Figure 3A:
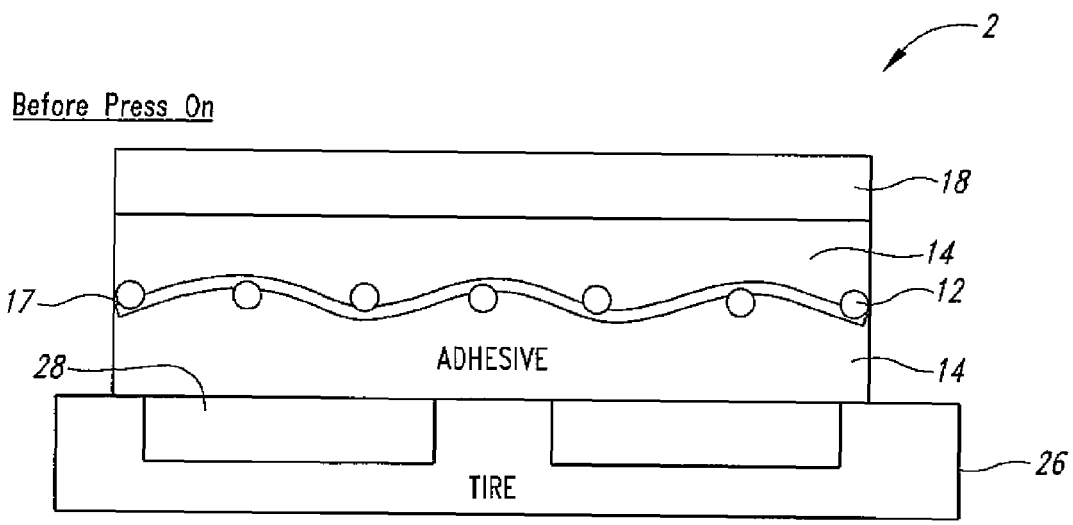
Figure 3B:
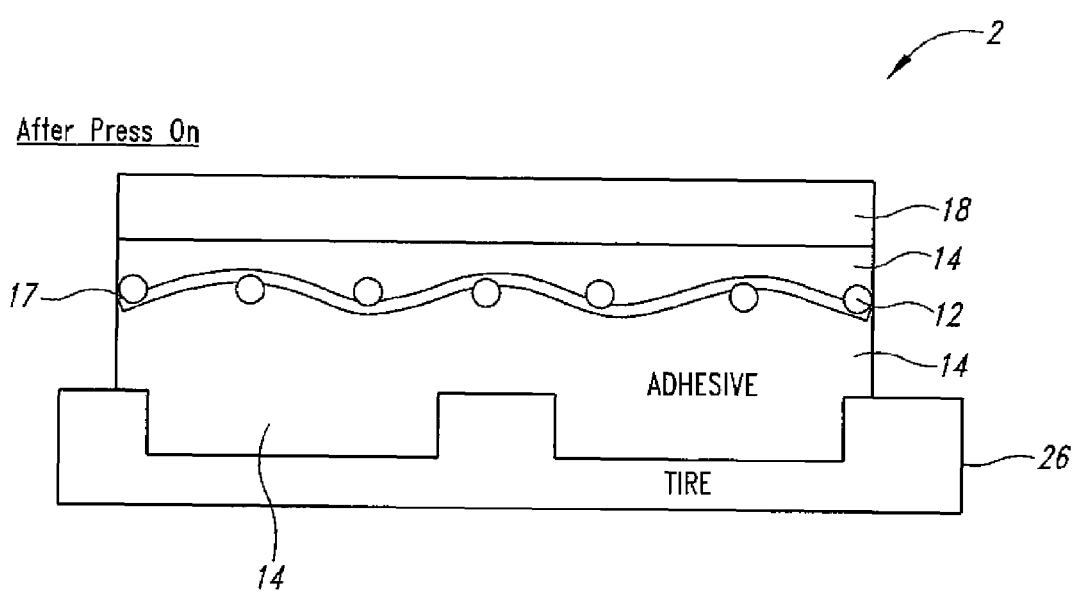
Figure 3C:
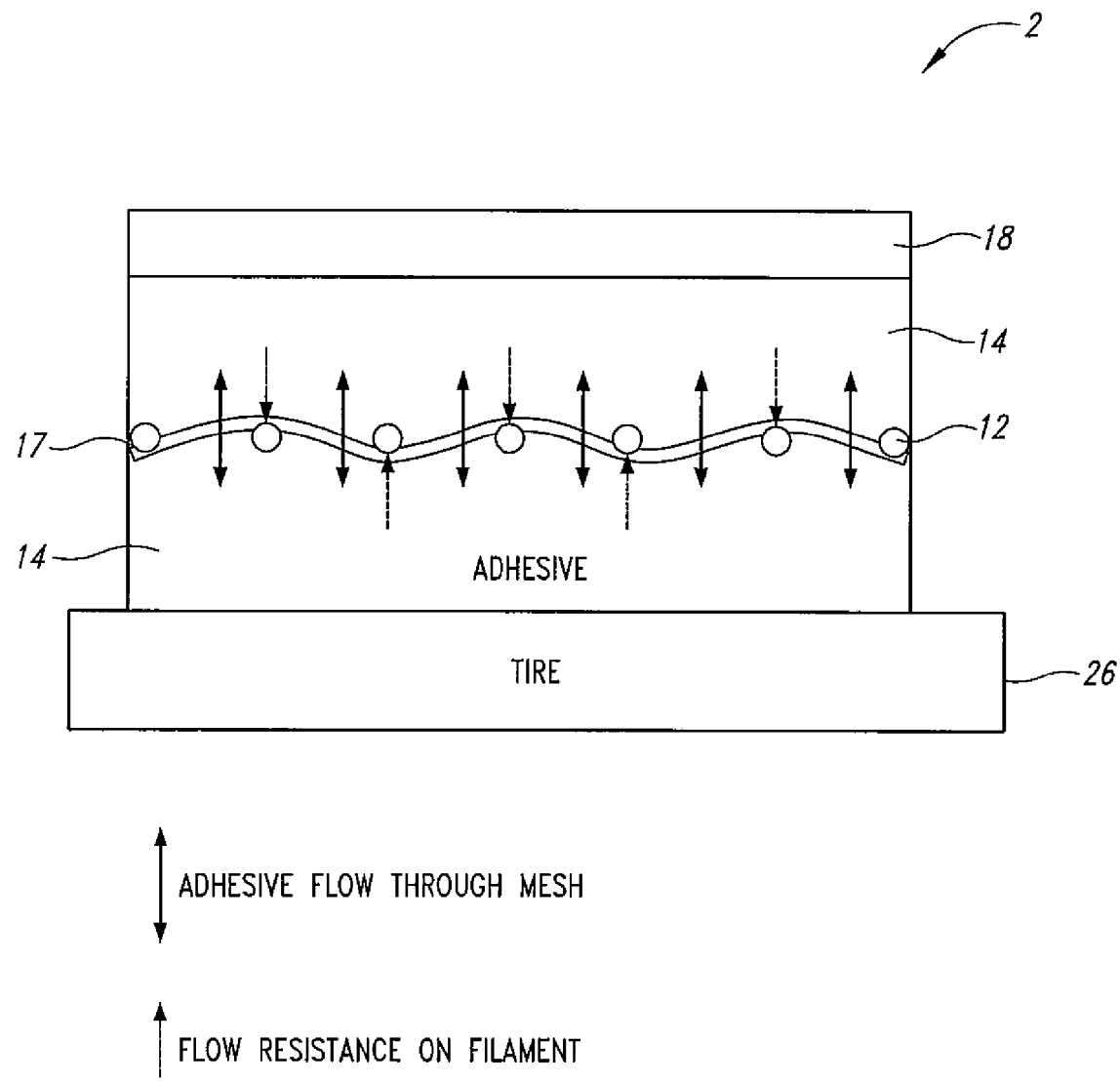
FIG. 3C is a cross section of the inventive tire label of FIGS. 3A and 3B showing adhesive flow.

Over time, some rubber based pressure sensitive adhesives will develop a strong enough bond to the tire surface that the separation interface will either be cohesive (separation within the adhesive layer) or adhesive (separation at the label-adhesive interface). This is a common problem with solid label films such as polypropylene, vinyl and polyethylene. An alternate embodiment, as shown in FIGS. 3A and 3B, addresses these problems by utilizing the intermediate layer, which may be an open mesh material, located between the solid film label (cap layer 18) and tire 26. Mesh materials provide unique benefits over solid film materials, such as greater surface area, keying of the adhesive, and adhesive mobility to promote adhesion.

To enhance adhesion of the label to a tire sidewall having surface irregularities, such as serrations, raised or depressed lettering, vent ports and tread, extra adhesive 14 is pushed through the intermediate layer 17 to better contact the recessed areas 28 of a tire surface. The intermediate layer 17 can be made of a mesh, woven or knit fabric. The filaments 12 have a greater surface area exposed to the adhesive as compared to a solid film. As the thread count increases, the adhesive surface area also increases.

A further benefit of this embodiment is when adhesive 14 flows through the weave between the filaments 12 of the intermediate layer 17, there is added resistance which increases the pull strength of adhesive on the label 2 and reduces cohesive failure within the adhesive 14.

The invention claimed is:

1. A tire label, comprising:
   a woven polyester mesh label face stock;
   a first layer of adhesive carried by a first side of the label face stock;
   an open woven mesh material intermediate layer carried by the first layer of adhesive on a first side of the intermediate layer, wherein the first layer of adhesive separates the first side of the label face stock from the first side of the intermediate layer, and wherein when the tire label is pressed onto a tire at least some of the adhesive from the first layer of adhesive passes through openings in the intermediate layer from the first side of the intermediate layer to an opposed second side of the intermediate layer;
   a second layer of adhesive carried by at least a first portion of the second side of the intermediate layer, a second portion of the second side of the intermediate layer being substantially free of the second layer of adhesive to form a pull tab;
   a primer carried on at least a portion of the first side of the label face stock between the first side of the label face stock and the first layer of adhesive;

a release liner releasably carried overlying the second layer of adhesive, the release liner being selectively removable to expose the second layer of adhesive; and a radio frequency identification (RFID) insert carried by the label face stock, the RFID insert positioned between the label face stock and the release liner.

2. The tire label of claim 1 wherein at least a portion of the first layer of adhesive overlies the RFID insert such that at least some of the adhesive is positioned between the RFID insert and the release liner.

3. The tire label of claim 1 wherein the label face stock is adapted to conform to an irregular surface.

4. The tire label of claim 1 wherein the label face stock is made of filaments of about 64 microns diameter.

5. The tire label of claim 4 wherein the label face stock has a thread count of about 156 threads per inch.

6. The tire label of claim 5 wherein the first layer of adhesive forms a layer having a thickness of approximately 3-6 mils.

7. The tire label of claim 4 wherein at least a portion of the label face stock is impregnated with at least a portion of the first layer of adhesive.

8. The tire label of claim 1 wherein the label face stock has a thread count of about 156 threads per inch.

9. The tire label of claim 1 wherein the label face stock has been dyed, pigmented or printed.

10. The tire label of claim 1 wherein the first layer of adhesive forms a layer having a thickness of approximately 3-6 mils.

11. The tire label of claim 1 wherein the first layer of adhesive is selected from the group consisting of pressure sensitive, heat seal, UV-cured, epoxy, rubber-based, acrylic based, and combinations thereof.

12. The tire label of claim 1 wherein the adhesive in the first layer of adhesive and the second layer of adhesive is selected from the group consisting of pressure sensitive, heat seal, UV-cured, epoxy, rubber-based, acrylic based, and combinations thereof.

13. The tire label of claim 1 wherein the first layer of adhesive has a thickness of approximately 3-6 mils, the label face stock is made of filaments of about 64 microns in diameter and the label face stock has a thread count of about 156 threads per inch.

14. The tire label of claim 13 wherein at least a portion of the first layer of adhesive overlies the RFID insert such that at least some of the adhesive is positioned between the RFID insert and the release liner.

15. The tire label of claim 14 wherein the first layer of adhesive is selected from the group consisting of pressure sensitive, heat seal, UV-cured, epoxy, rubber-based, acrylic based, and combinations thereof.

16. The tire label of claim 1 wherein the label is die cut.

17. The tire label of claim 1 wherein at least a portion of the label face stock is impregnated with at least a portion of the first layer of adhesive.

18. The tire label of claim 1 wherein the tire layer further comprises a pull tab portion of said label facestock, said pull tab portion being free of adhesive.

* * * * *

UNITED STATES PATENT AND TRADEMARK OFFICE
CERTIFICATE OF CORRECTION

PATENT NO. : 7,338,914 B2  
APPLICATION NO. : 10/814436  
DATED : March 4, 2008  
INVENTOR(S) : Kevin Conwell et al.

Page 1 of 1

It is certified that error appears in the above-identified patent and that said Letters Patent is hereby corrected as shown below:

Column 4  
Line 55, "pressed onto," should be deleted and replaced with -- adhered to --.

Lines 61-64, the words "a second portion of the second side of the intermediate layer being substantially free of the second layer of adhesive to form a pull tab;" should be deleted.

Signed and Sealed this

Seventh Day of April, 2009

JOHN DOLL  
*Acting Director of the United States Patent and Trademark Office*